United States Patent [19]

Fletcher

[11] 4,202,519
[45] May 13, 1980

[54] AIRFOIL LEADING EDGE SLAT APPARATUS

[75] Inventor: John J. Fletcher, Renton, Wash.

[73] Assignee: The Boeing Company, Seattle, Wash.

[21] Appl. No.: 940,708

[22] Filed: Sep. 8, 1978

[51] Int. Cl.$^2$ ............................................... B64C 3/50
[52] U.S. Cl. .................................... 244/214; 244/210
[58] Field of Search ........................ 244/214, 210, 213

[56] References Cited

U.S. PATENT DOCUMENTS

| | | | |
|---|---|---|---|
| 2,990,140 | 6/1961 | Mazelsky | 244/214 |
| 3,504,870 | 4/1970 | Cole et al. | 244/214 |
| 3,556,439 | 1/1971 | Autry et al. | 244/214 |
| 3,743,219 | 7/1973 | Gorges | 244/214 |
| 3,910,530 | 10/1975 | James | 244/214 |

*Primary Examiner*—Charles E. Frankfort

[57] ABSTRACT

A leading edge slat apparatus especially adapted to be deployed from the undersurface of an airfoil without encountering excessive resistance from the airstream. The apparatus comprises a slat member which is stowed in an airfoil with the forward end positioned forward of the rear end and which is moved downwardly and forwardly to its deployed position. Concurrently therewith, the rear end is moved upwardly relative to the forward end, with the forward end still being positioned forwardly of the rear end. In a first embodiment, a main actuating member has a forward end pivotally connected to the slat member and a rear end slideably connected to the airfoil. A tilting arm is pivotally connected to the airfoil at one end and pivotally connected to the actuating member and a tilting link at a second end. When the slat member is moved from the stowed position to the deployed position, the tilting link co-acts with the tilting arm and the main actuating member to rotate the rear end of the slat member upwardly relative to the forward end of the slat member. In a second embodiment there is a slat member, a positioning arm, first and second pivot arms and an actuating device. The actuating device rotates the positioning arm in order to pivot the first and second pivot arms which in turn move the slat member downwardly and forwardly and elevate the rear end of the slat member relative to the forward end.

21 Claims, 9 Drawing Figures

AIRFOIL LEADING EDGE SLAT APPARATUS

BACKGROUND OF THE INVENTION

1. Field of the Invention

The present invention relates to high lift leading edge devices, such as those deployed from the under surface of an aircraft airfoil.

2. Description of the Prior Art

One type of prior art leading edge flap device comprises a retractable articulated flap which is folded into the underside of an aircraft wing in an upside down and rearwardly facing manner, as in U.S. Pat. No. 3,910,530, James et al. A rigid structural member is pivotally connected to the leading edge of the wing and has a panel supporting edge with a curvature corresponding to the desired curvature of the flap airfoil surface. A bullnose is pivotally mounted on the rigid structural member and forms the leading portion of the flap airfoil surface when extended. An actuating means is coupled between the wing and flap means for moving the flap means between the retracted and extended positions. A linkage means is mounted on the flap and is operative in response to movement of the actuating means for flexing the leading edge flap to the desired curvature, and also to pivot the bullnose to the extended position.

Another type of prior art flap mechanism is shown in U.S. Pat. No. 3,917,192, Alvarez-Calderon, wherein a flap actuator mechanism moves the flap members from an upside down and rearwardly facing position to a deployed position. The leading edge flap may have a nose section which is pivotally mounted to the main body of the flap and which is retracted when the flap is in the stowed position. A plurality of links and bell cranks coact to pivot the flap member into the deployed position.

U.S. Pat. No. 2,990,140, Mazelsky, discloses yet another high lift device for an airplane wherein there is a series of sprockets and gear mechanisms which pivot a leading edge flap or slat from the underside of the wing to an operative position about a shaft mounted in the wing. The angle of attack of the leading edge flap may be adjusted when it is positioned in front of the wing leading edge.

As other examples of the prior art, U.S. Pat. No. 2,361,574, Tanpier, shows a leading edge flap which may be deployed in the underside of the wing by slideably mounting the flap member on racks carried in guides. By actuating a pinion, the flap will be carried straight forwardly to an operative position, at which point the angle of attack may be varied.

U.S. Pat. No. 1,891,261, Gunn, shows a method of deploying auxiliary wings by activating push rods which are interconnected by a system of pullies and cables wound on a drum.

U.S. Pat. No. 2,346,464, Tanpier, and 2,583,405, Youngman, show systems of deploying trailing edge flap members from the under surface of a wing.

French Pat. No. 57,988, Lemoigne, shows various methods of deploying flap members from the under surface of the leading edge of an aircraft wing.

German Pat. No. 2,059,926, Heinz, illustrates a method of deploying a high lift device in which two rigid members are interconnected by a flexible member. The forward or upward rigid member is pivotally connected to the aircraft wing, and the rearward and downward rigid member is deployed from a pair of pivotally mounted parallel links. Upon deployment of the two rigid members, the flexible member assumes an airfoil leading edge configuration therebetween.

One of the problem areas associated with the deployment of many high lift leading edge devices is that when such devices stow the leading edge flap in an "upside down" position and swing the flap from a forward pivot axis downwardly into the air stream toward its deployed position, the flap is temporarily positioned broadside in the air stream. One disadvantage of this is that the power requirements to deploy the flap are relatively high. Accordingly, it is an object of the present invention to provide a leading edge device which in a particularly effective manner deploys the flap or slat from beneath the wing without encountering excessive resistance from the airstream.

SUMMARY OF THE INVENTION

In the present invention there is a leading edge slat apparatus deployable from an undersurface of an airfoil, the airfoil having a forward leading edge and a rear trailing edge, and the slat apparatus having a forward end and a rear end. The slat member has a first stowed position in the airfoil with said forward end positioned forward of said rear end and being movable from the first stowed position downwardly and forwardly to a second deployed position, such that the rear end moves upwardly relative to the forward end and the forward end remains positioned forwardly of the rear end in the deployed position.

There is a main actuating member pivotally connected to said slat member at one end and operatively connected to the airfoil at a second end, a tilting arm having a pivot end connected to the airfoil and a swing end with second and third spaced connecting locations, the second connecting location being pivotally connected to said actuating member. There is also a tilting link having a first end pivotally connected to the tilting arm at the third connecting location and a second end pivotally connected to the slat member, such that when the slat member is moved from the stowed position to the deployed position, the tilting link co-acts with the tilting arm and the main actuating member to rotate the rear end of the slat member upwardly relative to the forward end of the slat member.

The first, second, third and fourth connecting locations are positioned relative to one another such that when the slat member is moved from the stowed position to the deployed position, a line drawn between the first and second connecting locations intersects a line drawn between the third and fourth connecting locations.

In one embodiment the rear end of the main actuating member is slideably mounted in a slideway aligned along a cordwise axis of the airfoil. This slideway can take the form of a track for rollers secured to the main actuating member. The first end of the main actuating member is affixed on a lower surface of the slat member with the second connecting location being positioned medial the first connecting location and the rear end of the main actuating member. The third connecting location is spaced outwardly of the second connecting location on the tilting arm relative to the first mounting location.

There is a drive means which comprises a torque tube means mounted in the airfoil, and a toggle linkage pivotally connecting the torque tube means to the tilting arm, so that upon rotation of the torque tube means the toggle linkage moves the slat member between its stowed position and its operative position.

In a second embodiment of the invention, the leading edge slat apparatus comprises a slat member similar to that in the first embodiment, as well as a positioning arm pivotally mounted to said airfoil for rotation about a mounting location. However, the main actuating member is connected to the airfoil by a second mounting arm in addition to the positioning arm.

The present invention can also be defined as having a first pivot arm pivotally connected to the slat member at a first pivot location and pivotally connected to said positioning arm at a second pivot location, and a second pivot arm pivotally connected to said slat member at a third pivot location located rearward of the first pivot location, and pivotally connected to said positioning arm at a fourth pivot location spaced radially outward of the second pivot location. An actuating means is connected to the positioning arm to rotate the positioning arm about the mounting location. Upon rotating the positioning arm about the mounting location the first and second pivot arms are pivoted about the second and fourth pivot locations thereby moving the slat member downwardly and forwardly from its stowed position to its operative position.

DESCRIPTION OF THE PREFERRED EMBODIMENT

Figure 1:
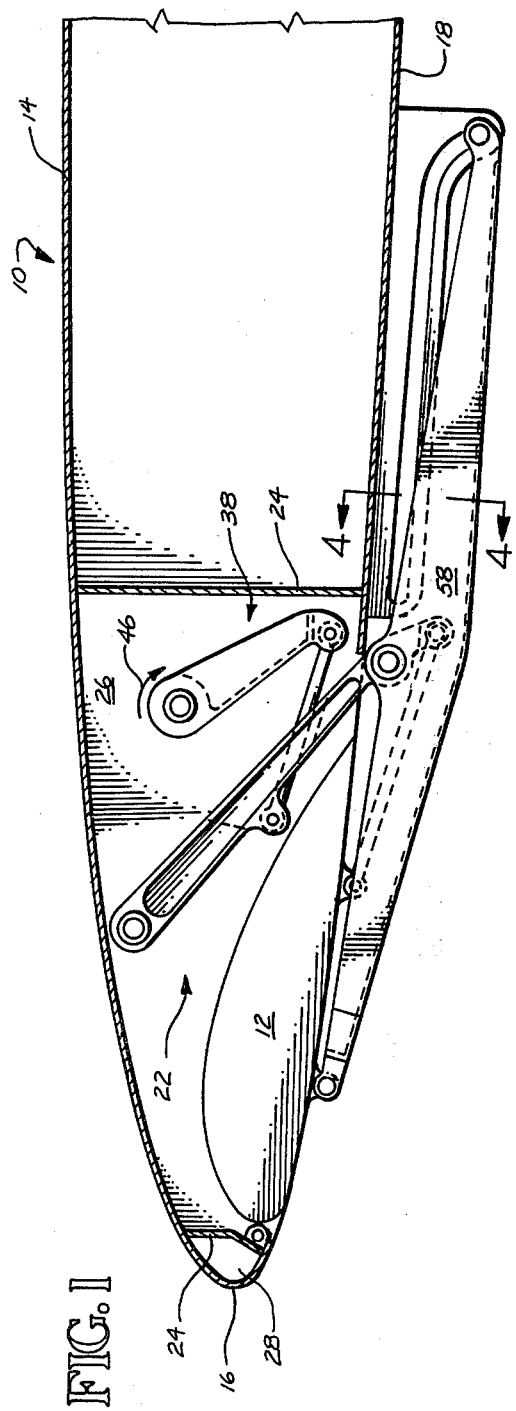
FIG. 1 is a transverse sectional view taken along the cordwise axis of an aircraft wing showing the present invention in its stowed position therein.

As shown in FIGS. 1-4, there is illustrated a first embodiment of the present invention. There is, generally, an aircraft wing 10 and a leading edge slat member 12. The wing 10 has a continuous upper surface panel 14, a leading edge panel 16, and a lower surface panel 18 having an opening 20 to receive the leading edge slat apparatus of the present invention, generally designated 22.

It is to be understood that the wing 10 is constructed in a conventional manner with spanwise-oriented wing spars 24 located therein. A number of ribs 26 (shown herein singularly) extend between the wing spars 24 at spaced intervals along the spanwise dimension of the wing. The upper and lower surface panels 14 and 18 respectively, extend the spanwise length of the wing 10 and are attached to the ribs 26.

Figure 2:
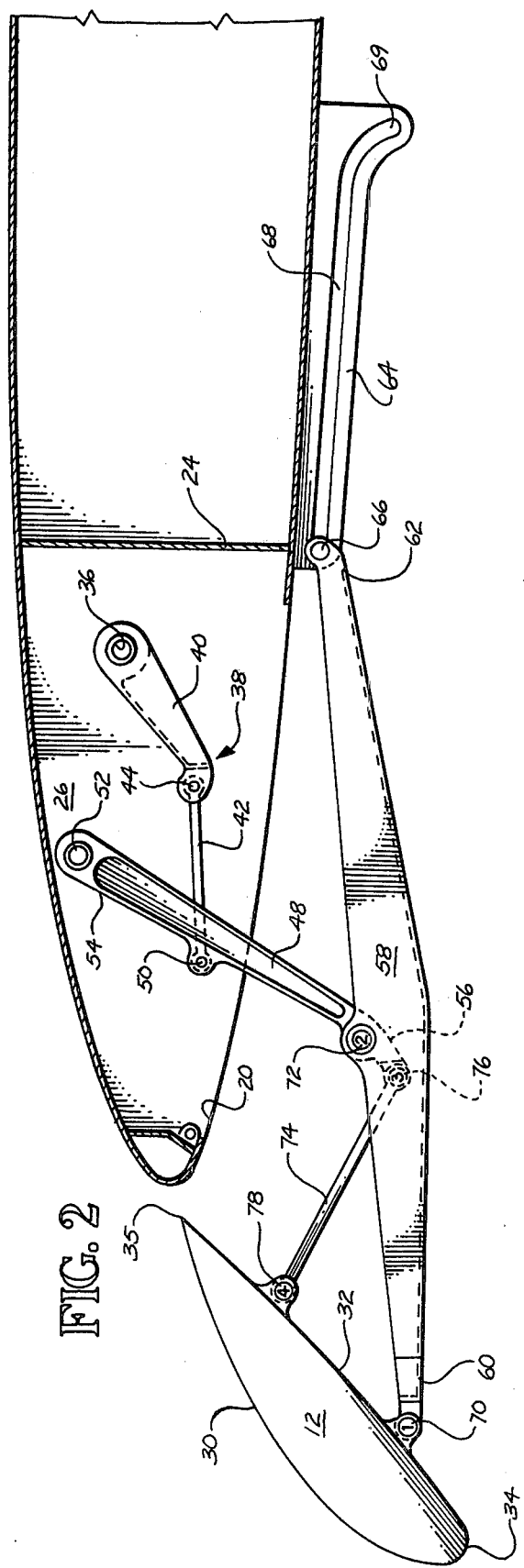
FIG. 2 is a transverse sectional view of an aircraft wing taken along the cordwise axis showing the present invention in its deployed position.
Figure 3:
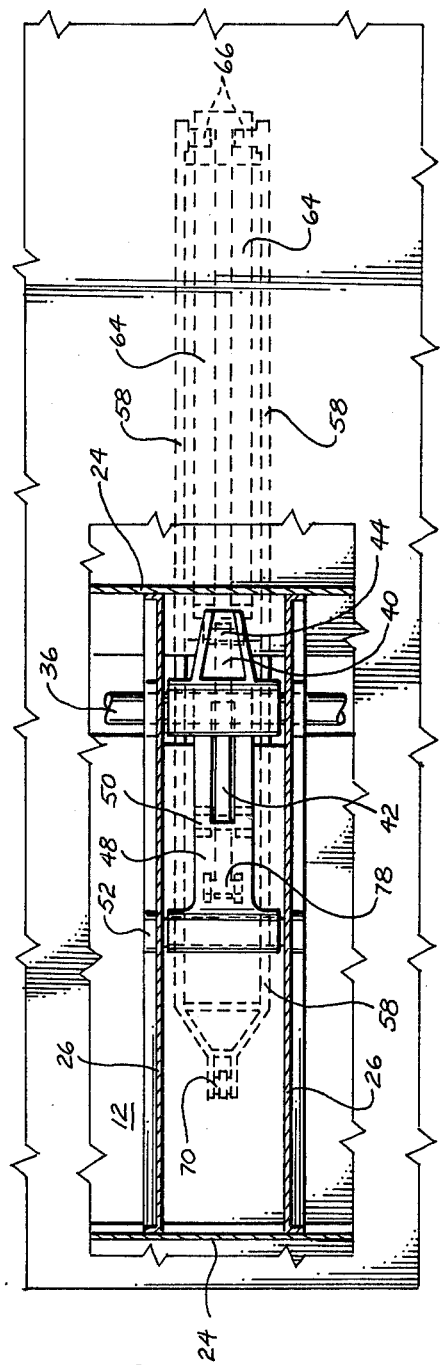
FIG. 3 is a top plan view of FIG. 1, with portions of the upper skin of the airfoil broken away.

The leading edge slat apparatus 22 includes the slat member 12, which is illustrated in FIG. 1 in a first stowed position, and in FIG. 2 in a second operative position spaced downwardly and forwardly from the leading edge 16 of the wing 10. The slat member 12 is received in the opening 20 in the lower surface panel 18, and has a conventional airfoil configuration, with an upper surface panel 30, a lower surface panel 32, a leading edge 34 and a trailing edge 35. The lower surface panel 32 is constructed such that when the slat member 12 is in the stowed position of FIG. 1, it will as closely as possible contour to the configuration of the lower surface panel 18 of the wing 10.

The power to move the flap member 12 from the stowed position of FIG. 1 to the operative position of FIG. 2 is supplied by a power hinge or torque tube 36 and drive linkage 38, comprised of first and second arms 40 and 42, respectively, pivotally connected to one another at 44. The torque tube 36 is mounted in the wing 10 in spanwise relationship, and the first arm 40 is fixedly connected thereto. By rotating the torque tube 36 in the direction indicated by arrow 46, the slat member 12 will be moved from its stowed position to its operative position.

The second arm 42 of the drive linkage 38 is pivotally connected to a positioning or tilting arm 48 at 50. The positioning arm 48 is pivotally mounted to the rib 26 at a first mounting location 52. The positioning arm 48 may be considered as having a pivot end 54 at the first mounting location, and a swing end 56 at the other end thereof.

Figure 4:
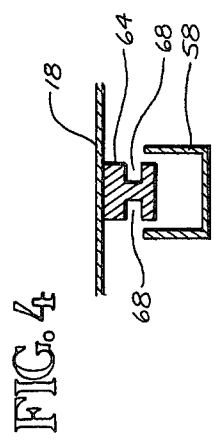
FIG. 4 is a sectional view taken along line 4—4 of FIG. 1.
Figure 5:
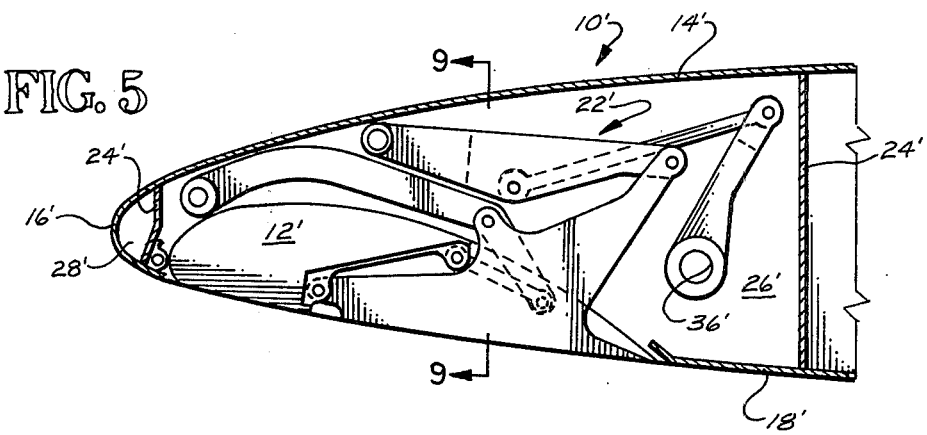
FIG. 5 is a transverse sectional view of an aircraft wing taken along the cordwise axis showing a second embodiment of the present invention in its stowed position.
Figure 6:
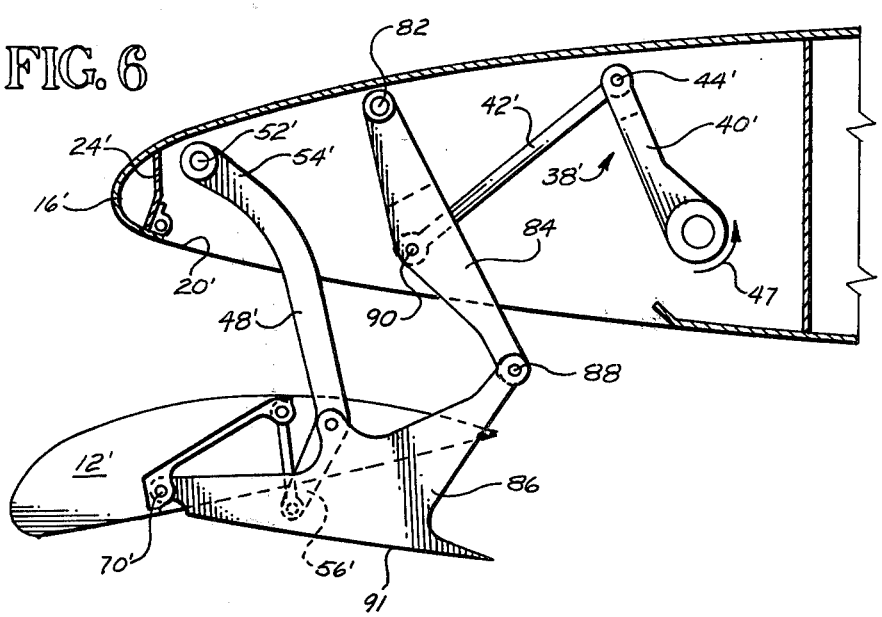
FIG. 6 is a view similar to FIG. 5 showing the second embodiment in its partially deployed position.
Figure 7:
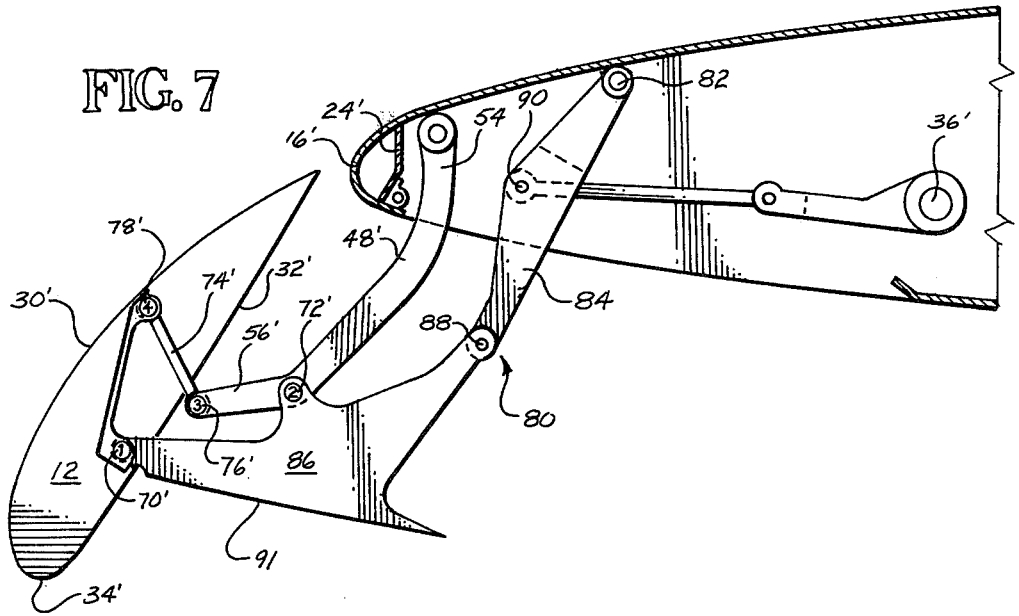
FIG. 7 is a view similar to FIGS. 5 and 6 showing the second embodiment of the present invention in a deployed position.
Figure 8:
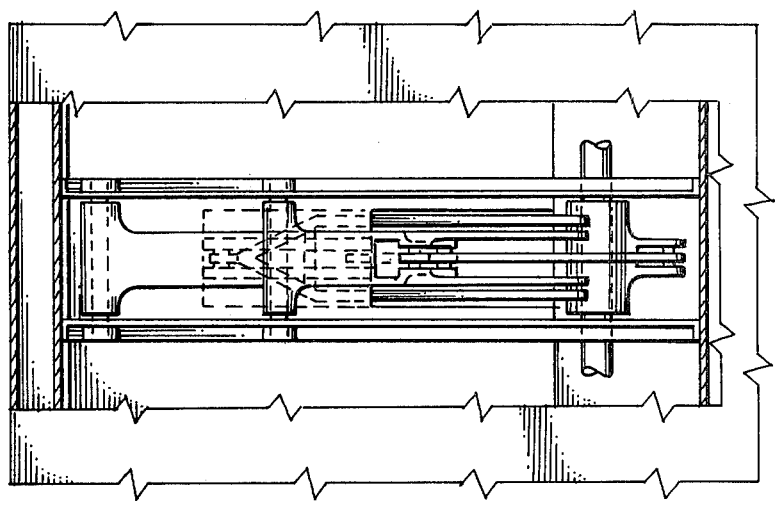
FIG. 8 is a top plan view of the apparatus of FIGS. 5-7, with portions of the upper skin broken away.
Figure 9:
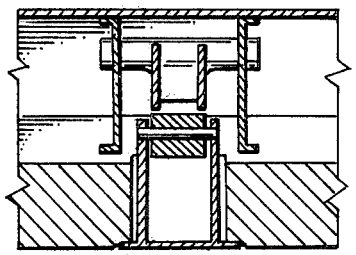
FIG. 9 is a sectional view taken along line 9—9 of FIG. 5.

There is a main actuating member 58 having a forward end 60 and a rear end 62. The rear end 62 of the main actuating member 58 is slideably mounted in a slideway or track 64 for forward and rearward movement along the cordwise axis of the wing 10. The main actuating member 58 is retained within the slideway 64 by opposing pin members or rollers 66 which slide in slots 68 provided in the slideway 64, as shown in FIG. 4. The slots 68 are longitudinally aligned (i.e. in line with the chordwise axis of the wing 10), and the rear end of the slots 68 are turned downwardly and rearwardly as at 69. The forward end 60 of the main actuating member 68 is pivotally connected at a first pivot connecting location 70 to a forward portion on the lower surface panel 32 of the slat member 12.

There is a second pivot connection 72 on the main actuating member 58 located medial the forward and rear ends 60 and 62 respectively, where the swing end 56 of the positioning arm 48 connects to the main actuating member 58. There is a tilting link 74, having a rear end which connects to the outer end of the positioning arm 48 at a third connecting location 76, and a forward end that connects to the slat member 12 at a fourth pivot location 78. As shown in FIGS. 1 and 2, the third pivot connection 76 is spaced adjacent to and radially outwardly from the second pivot connection 72 relative to the pivot end 54 of the positioning arm 48. The fourth pivot connection is at the lower surface panel 32 of the slat member 12, positioned rearwardly of the first pivot location 70.

The operation of this first embodiment of the present invention will now be described. In cruise condition, the slat member 12 remains in its stowed position as shown in FIG. 1. Under conditions requiring high lift characteristics, such as in landing an aircraft, the slat member 12 is moved to its deployed position shown in FIG. 2. This is accomplished by actuating the torque tube means 36 in the direction of the arrow 46, so that the first arm 40 of the drive linkage 38 will rotate with the torque tube 36. As the first arm 40 rotates clockwise, the second arm 42 is pushed forwardly, thereby rotating the positioning arm 48 about the first mounting location 52. As the swing end 56 of the positioning arm 48 moves forwardly, it forces the main actuating member 58 to move forwardly in the slideway or track 64. However, it will be noted that the initial travel of the rear end 62 of the main actuating member 58 is upwardly and forwardly in the slideway portion 69. This causes the forward end 62 of the member 58 to move downwardly about the location 72 as a pivot point, thus moving the slat member 12 downwardly to clear the wing 10. Also, if one visualizes the partial arc of the swing end 56 of the positioning arm 48 about the first mounting location 52, from an upper rearward location when in the stowed position of FIG. 1, clockwise to an upper forward location in the deployed position of FIG. 2, it is readily apparent that the initial movement of the swing end 56 at the second pivot connecting location 72 will be downward and forward. Such movement also contributes to the initial downward movement of the slat member 12 from the wing 10, and finally properly positions the slat member 12 below and forward of the leading edge 16 of the wing 10 in a position to provide maximum lift. It can also be seen from FIG. 2 that the ultimate position of the second pivot connecting location 72 on the arc of the positioning arm 48 when in the deployed position, is somewhat below the position of the second pivot connecting location 72 when in the stowed position of FIG. 1.

As the flap member 12 is moved from its stowed position downwardly and forwardly by the forward and downward movement of the main actuating member 58, the rear end 35 of the slat member 12 is elevated above the front end 34 due to the action of the tilting link 74. The reason for this is that as the positioning arm 48 moves forward about the second pivot location 72, since the third pivot connection 76 is spaced radially outwardly from the second pivot location relative to the location 52, the third pivot connecting location 76 moves forward a greater distance than the second pivot connecting location 72. Therefore, the fourth pivot connecting location 78 traverses a greater forward horizontal distance than the first pivot connecting location 70 and is therefore rotated upwardly by the tilting link 74.

To analyze further the operating characteristics of the first embodiment of the present invention, the movement of the slat member 12 can be considered as being made up of three components of movement, namely:

a. a downward component of movement,
b. a forward component of movement,
c. a rotational component of movement.

The effect of these three components is that in its deployed position the slat member 12 is positioned forwardly and downwardly of the leading edge 16 of the wing 10, with the slat member 12 being slanted downwardly and forwardly so that its trailing edge 35 is elevated with respect to its leading edge 34.

The downward and forward components of movement can be considered as being caused primarily by the cooperating action of the positioning arm 48 and the main actuating member 58. As indicated previously, the downward and forward swing motion of the positioning arm 48 causes the member 58 to move the slat member 12 to the position downward and forward of the wing leading edge 16.

The third component of movement (namely the rotational movement of the slat member 12) can be considered as being a result of cooperating action of the positioning arm 48, the main actuating member 58, and the tilting link 74. With reference to FIG. 2, it will be noted that if a line is drawn between the first pivot connection 70 and second pivot connection 72, and a second line is drawn between the third pivot connction 76 and the fourth pivot connection 78, these two lines will intersect one another, and this relationship remains during a substantial portion of the travel of the slat member 12 from its stowed to its deployed position. As indicated previously, since the third pivot connection 76 is positioned radially outwardly from the second pivot connection 72 relative to the point of rotation 52 of the arm 48, there is greater linear travel of the fourth pivot connection 78 relative to the first pivot connection 70. This causes the rotational movement of the slat member 12 to rotate to the deployed position where the slat member 12 extends downwardly and forwardly, with its trailing edge 35 being raised relative to its forward leading edge 34. In a functional sense, relative to the rotational movement of the slat member 12, the forward portion of the main actuating member 58 (that portion between the first and second connecting locations 70 and 72) can be considered as a second link which is crossed with the link 74, so that the two links cooperate to cause the rotational movement of the slat member 12.

To reposition the flap member 12 within the wing when high lift conditions are no longer needed, the rotation of the torque tube 36 is simply reversed opposite that of arrow 46 and the entire assembly 22 retracts to its stowed position.

In a second embodiment of the present invention illustrated in FIGS. 5-9, the components of the wing 10 structure which house the leading edge flap apparatus 22 are identical and will not be discussed further herein. Components of the second embodiment which are the same or similar to components of the first embodiment will be given like numerical designations, with a prime (') designation, distinguishing those of the second embodiment.

The torque tube means 36' is mounted in spanwise relationship within the airplane wing 10' through the rib 26'. However in this second embodiment the rotation of the torque tube 36' is counterclockwise as shown in arrow 47, to move the flap member 12'. The drive linkage 38' again consists of a first arm 40' fixedly connected to the torque tube 36', and pivotally connected at 44' to a second arm 42'.

In the second embodiment, the positioning arm 48' is again pivotally mounted to the rib 26' at a first mounting location 52', and consists of a pivot end 54' and a swing end 56'. The primary difference between the second embodiment of FIGS. 5-9 and the first embodiment of FIGS. 1-4 lies in the configuration of the main actuating member, which in the second embodiment is designated 80. The main actuating member 80 consists of an articulated member pivotally mounted to the rib 26' at a second mounting location 82 spaced rearwardly of the first mounting location 52'.

The main actuating member 80 consists of upper and lower members, 84 and 86 respectively, which are pivotally connected to an intermediate flexure point 88. Instead of the drive linkage 38' being connected to the positioning arm 48' as in the first embodiment, the second arm 42' is pivotally connected at 90 to the upper actuating member 84. The upper member 84 can be considered as a mounting arm 84, and the lower member 86 can be considered as an actuating arm 86. The lower actuating arm 86 has a lower flange 91 which has the same surface contour as the slat lower panel 32', such that in the stowed position of FIG. 5, they form a surface contiguous with that of the lower surface panel 18' of the wing 10'.

The lower actuating arm 86 is pivotally connected to the flap member 12' at a first pivot connecting location 70', and to the positioning arm 48' at a second pivot connecting location 72'. The tilting link 74' is again connected between the third and fourth pivot connecting locations 76' and 78', respectively, on the swing end 56' of the positioning arm 48' and at a rearward location of the flap member 12'.

When the torque tube 36' is rotated counterclockwise as shown in arrow 47, the first arm 40' of the drive linkage 38' will force the second arm 42' to move the upper actuating arm 84 pivotally about the second mounting location 82. Because of the articulated nature of the main actuating member 80, this rotational movement of the upper mounting arm 84 forces the lower actuating arm 86 and the flap member 12 downwardly out of the enclosure on the underside of the wing 10'. In a sense, the positioning arm 48' and the mounting arm 84 cooperate as a parallel linkage to move the actuating arm 86 downwardly and forwardly, the swing end 56' of the positioning arm 48' forces the tilting link 74' to elevate the rear end of the flap member 12' as in the first embodiment. By rotating the torque tube 36' clockwise, the flap apparatus 22' will be retracted into the stowed position on the underside of the wing 10'.

What is claimed is:

1. In an airfoil having a forward leading edge and a rear trailing edge, a leading edge slat apparatus deployable from an under surface of said airfoil, said leading edge slat apparatus comprising:
   a. a slat member having a forward end and a rear end, and having a first stowed position in said airfoil with said forward end positioned forward of said rear end, said slat member being movable from said first stowed position downwardly and forwardly to a second deployed position, and being moveable rotatably so that said rear end moves upwardly relative to said forward end, with said forward end still being positioned forwardly of said rear end,
   b. a main actuating member having a forward end pivotally connected to said slat member at a first connecting location, and a rear end operatively connected to said airfoil,
   c. a positioning arm having a pivot end operatively connected to said airfoil for forward and rearward rotational movement about a first mounting location, and a swing end with second and third spaced connecting locations thereon, said actuating member being pivotally connected to said positioning arm at said second connecting location,
   d. a tilting link having a first end pivotally connected to the positioning arm at said third connecting location, and a second end pivotally connected to said slat member at a fourth connecting location spaced from said first connecting location on said slat member,
   e. said first, second, third and fourth connecting locations being so arranged relative to each other that when said slat member is being moved from the stowed position to the deployed position, said tilting link coacts with said positioning arm and said main actuating member to rotate the rear end of the slat member upwardly relative to the forward end of the slat member.

2. The apparatus as recited in claim 1, wherein said first, second, third and fourth connecting locations are positioned relative to each other so that during a major portion of travel of said slat member from said stowed position to said deployed position, a line drawn between said first and second connecting locations intersects a line drawn between said third and fourth connecting locations.

3. The apparatus as recited in claim 2, wherein said first connecting location is positioned on said slat member forwardly of said fourth connecting location, and said third connecting location is positioned radially outward of said second location relative to the pivot end of the positioning arm.

4. The apparatus as recited in claim 1, where the rear end of said main actuating member is slideably mounted in a slideway aligned along a cordwise axis of said airfoil.

5. The apparatus as recited in claim 4, wherein said first end of the main actuating member is located on a lower surface of said slat member and said second connecting location is positioned medial said first connecting location and said rear end of said main actuating member.

6. The apparatus as recited in claim 5, wherein said third connecting location is spaced radially outwardly of said second connecting location on said positioning arm relative to said first mounting location.

7. The apparatus as recited in claim 1, further comprising a drive means which comprises a torque tube means mounted in said airfoil, a toggle linkage fixedly connected to said torque tube means and pivotally connected to said positioning arm, whereby upon rotation of said torque tube means, said toggle linkage moves said slat member between its stowed position to its operative position.

8. The apparatus as recited in claim 1, further comprising a mounting arm having a first end mounted to said airfoil for rotation about a second mounting location spaced from said first mounting location, and a second end connected to said main actuating member at a fifth connecting location spaced from said second connecting location, whereby said main actuating member moves said slat member between its stowed and deployed positions by rotational motion about said positioning arm and said mounting arm.

9. The apparatus as recited in claim 8, wherein said main actuating member comprises at least a partial lower flange surface thereon adapted to interfit with said slat member to form a contiguous under surface on said airfoil when said slat member is in said stowed position.

10. The apparatus as recited in claim 1, wherein said main actuating member comprises at least a partial lower flange surface thereon adapted to interfit with said slat member to form a contiguous under surface on the airfoil when said slat member is in its stowed position.

11. In an airfoil having forward and rear ends, a leading edge slat apparatus deployable from an under surface of said airfoil, said leading edge slat apparatus comprising:

a. a slat member having a forward end and a rear end, and having a stowed position in said airfoil and an operative position, with said slat member being movable from said stowed position downwardly and forwardly to said operative position, b. a positioning arm pivotally mounted to said airfoil for rotation about a mounting location, c. a first pivot arm pivotally connected to said slat member at a first pivot location on said slat member, and pivotally connected to said positioning arm at a second pivot location, d. a second pivot arm pivotally connected to said slat member at a third pivot location located rearward of said first pivot location on said slat member, and pivotally connected to said positioning arm at a fourth pivot location spaced radially outwardly of said second pivot location relative to said mounting location, and e. actuating means connected to said positioning arm to rotate said positioning arm about said mounting location and to pivot said first and second pivot arms about said second and fourth pivot locations to move said slat member downwardly and forwardly and rotate said slat member relative to said positioning arm, whereby said slat member is moved from its stowed position forwardly and downwardly to its operative position.

12. The apparatus as recited in claim 11, further comprising drive means located within said airfoil, said drive means having a rotatably mounted drive arm and a connecting link connected between said drive arm and said positioning arm.

13. The apparatus as recited in claim 11, wherein said actuating means comprises a rearward extension of one of said pivot arms, said rearward extension having a rear end slideably mounted in said airfoil for forward and rear motion.

14. The apparatus as recited in claim 13, wherein one of said pivot arms and said rearward extension comprise a single substantially rigid member.

15. The apparatus as recited in claim 11, wherein said actuating means comprises a mounting arm having a first end pivotally connected to said airfoil and a second end pivotally connected to one of said pivot arms.

16. In an airfoil having a forward leading edge and a rear trailing edge, a leading edge slat apparatus deployable from an under surface of said airfoil, said leading edge slat apparatus comprising:

a. a slat member having a forward end and rear end, and having a first stowed position in said airfoil with said forward end positioned forward of said rear end, said slat member being moveable from said first stowed position downwardly and forwardly to a second deployed position, and being moveable rotatably so that said rear end moves upwardly relative to said forward end, with said forward end still being positioned forwardly of said rear end, b. a main actuating member having a forward end pivotally connected to said slat member at a first forward connecting location, and a rear end mounted to said airfoil for fore and aft motion relative to said airfoil, c. a positioning arm having a pivot end operatively connected to said airfoil for forward and rearward rotational movement of the positioning arm about a first mounting location, and a swing end with second and third spaced connecting locations thereon, said third connecting location being spaced radially outwardly of said second connecting location relative to said first mounting location, said actuating member being pivotally connected to said positioning arm at said second connecting location, d. a tilting link having a first end pivotally connected to the positioning arm at said third connecting location and a second end pivotally connected to said slat member at a fourth connecting location spaced rearwardly on said slat member from said first connecting location, whereby, when said main actuating member and said positioning arm are moved forwardly in moving said slat member from said stowed position to said deployed position, said tilting link coacts with said main actuating member and said positioning arm to cause said slat member to move forwardly and rotate the forward end thereof downwardly so that the slat member assumes a proper position relative to the leading edge of said airfoil.

17. The apparatus as recited in claim 16, further comprising slideway means mounted to said airfoil, the rear end of the main actuating member being mounted for slide motion in said slideway means.

18. The apparatus as recited in claim 17, wherein said slideway means defines a forwardly and rearwardly extending slide path for the rear end of said main actuating member, said slide path having a rear end portion extending downwardly, whereby initial motion of the rear end of the actuating member from a rear position is at least partly upward, to cause the forward end of the actuating member to move downwardly so as to move said slat member initially downwardly from said airfoil.

19. In an airfoil having a forward leading edge and a rear trailing edge, a leading edge slat apparatus deployable from an under surface or said airfoil, said leading edge slat apparatus comprising:

a. a slat member having a forward end and rear end, and having a stowed position in said airfoil with said forward end positioned forward of said rear end, said slat member being moveable from said first stowed position downwardly and forwardly to a second deployed position, and being moveable rotatably so that said rear end moves upwardly relative to said forward end, with said forward end still being positioned forwardly of rear end, b. a main actuating member having a forward end pivotally connected to said slat member at a first forward connecting location, a middle portion having a second connecting location, and a rear end having a third connecting location, c. a forward mounting arm having a first end pivotally, connected to said airfoil and a second end pivotally connected to said main actuating member at said second connecting location, d. a second mounting arm having a first end pivotally connected to said airfoil at a location which is spaced from the location at which the first end of the first mounting arm is connected to the airfoil, said second mounting arm having a second end pivotally connected to said main actuating member at said third connecting location, e. a tilting link having a first end pivotally connected to said slat member at a fourth connecting location positioned on said slat member rearwardly of said first connecting location, said tilting link having a second end pivotally connected to one of said two mounting arms at a fifth connecting location which is spaced radially outwardly from the connecting location on the mounting arm to which the tilting link is connected, whereby, when said slat member is moved from its stowed position to its deployed position, said main actuating member moves rotatably about said first and second mounting arms downwardly and forwardly, with said tilting link causing said slat member to rotate relative to said main actuating member so that said slat member assumes a proper position relative to said airfoil.

20. The apparatus as recited in claim 19, wherein said first and second mounting arms are so positioned that with said slat member in its stowed position, said first and second mounting arms extend substantially rearwardly, whereby when said slat member is initially moved from its stowed position, said movement is substantially downwardly to move said slat member free from said airfoil.

21. The apparatus as recited in claim 20, wherein said main actuating member further comprises at least a partial lower flange surface adapted to interfit with said slat member to form a contiguous under surface on said airfoil when said slat member is in said stowed position.

* * * * *